United States Patent [19]

Kitagawa et al.

[11] Patent Number: 5,287,136
[45] Date of Patent: Feb. 15, 1994

[54] PHOTOGRAPHIC CAMERA HAVING AN IMPROVED FILM TRANSPORT MECHANISM

[75] Inventors: Kiichiro Kitagawa; Hideaki Kataoka, both of Kanagawa, Japan

[73] Assignee: Fuji Photo Film Co., Ltd., Minami-ashigara, Japan

[21] Appl. No.: 818,285

[22] Filed: Jan. 9, 1992

[30] Foreign Application Priority Data

Jan. 10, 1991 [JP] Japan .................. 3-13847
Jan. 10, 1991 [JP] Japan .................. 3-13848

[51] Int. Cl.⁵ .................. G03B 1/18; G03B 17/24
[52] U.S. Cl. .................. 354/173.1; 354/105
[58] Field of Search .............. 354/173.1, 173.11, 203, 354/212, 214, 105, 173.1

[56] References Cited

U.S. PATENT DOCUMENTS

| | | | |
|---|---|---|---|
| 4,306,794 | 12/1981 | Fukahori et al. | 354/173 |
| 4,344,682 | 8/1982 | Hattori | 354/62 |
| 4,437,742 | 3/1984 | Taniguchi | 354/21 |
| 4,530,582 | 7/1985 | Hara et al. | 354/203 |
| 4,678,299 | 7/1987 | Harvey | 354/21 |
| 4,832,275 | 5/1989 | Robertson | 354/71.1 |
| 4,834,306 | 5/1989 | Robertson et al. | 354/71.1 |
| 4,846,418 | 7/1989 | Fairman | 354/71.1 |
| 4,855,773 | 8/1989 | Harvey . | |
| 4,860,037 | 8/1989 | Harvey . | |
| 4,996,546 | 2/1991 | Pagano et al. | 354/76 |
| 5,124,735 | 6/1992 | Tsukahara et al. | 354/106 |
| 5,130,728 | 7/1992 | Goto et al. | 354/105 |

FOREIGN PATENT DOCUMENTS

| | | |
|---|---|---|
| 0039492 | 3/1982 | European Pat. Off. . |
| 0228093 | 7/1987 | European Pat. Off. . |
| 0367996 | 5/1990 | European Pat. Off. . |
| 0160433 | 7/1987 | Japan .................. 354/203 |
| 9004201 | 4/1990 | PCT Int'l Appl. . |
| 9004202 | 4/1990 | PCT Int'l Appl. . |

OTHER PUBLICATIONS

Patent Abstracts of Japan vol. 8, No. 242 (P-311), Nov. 7, 1984, JPA 59116726 (Canon) May 7, 1984.
Patent Abstracts of Japan, vol. 11, No. 208 (P-593), Jul. 7, 1987.

Primary Examiner—Michael L. Gellner
Assistant Examiner—Nicholas J. Tuccillo
Attorney, Agent, or Firm—Sughrue, Mion, Zinn, Macpeak & Seas

[57] ABSTRACT

A photographic camera has a fork disposed in a cassette receiving chamber to be coupled to a spool core of a photographic film cassette. Photographic film from the photographic film cassette is wound on a take-up reel disposed in a photographic film take-up chamber. A magnetic head is disposed on a frame of an exposure aperture, and reads/writes data on a magnetic recording area of the photographic film. A brake pad applies load to the fork, and keeps the photographic film in such a tension as to ensure flatness during the one-frame feeding. A guide member is formed to project from an inner wall of the photographic film take-up chamber. When a photographic film leader is advanced into the photographic film take-up chamber, the photographic film leader is guided downstream from the take-up reel against a curling tendency.

23 Claims, 5 Drawing Sheets

PHOTOGRAPHIC CAMERA HAVING AN IMPROVED FILM TRANSPORT MECHANISM

BACKGROUND OF THE INVENTION

1. Field of the Invention:

The present invention relates to a photographic camera provided with a mechanism for recording data, such as exposure data, and more particularly to an improvement of a photographic film transporting system.

2. Description of the Related Art:

In a conventional photographic camera, an auto-loading mechanism is incorporated, for facilitating photographic film-loading, wherein the leading end of a photographic film leader is automatically captured on a take-up reel in a photographic film take-up chamber. Before loading, the photographic film leader of the conventional photographic film cassette is maintained in a state in which it protrudes from a photographic film passage mouth of the cassette shell. The protruded photographic film leader is inserted together with the cassette shell in the camera, fed to the photographic film take-up chamber by the auto-loading mechanism, and captured on the take-up reel.

A camera, in which photographic film provided with a magnetic recording area is utilized and which reads/writes data thereon, is known and is disclosed in International Publications WO 90/04201 and 90/04202. This camera incorporates a magnetic head, which reads/writes data on the magnetic recording area while the photographic film is transported between the photographic film take-up reel and the photographic film cassette. Such data includes photographic film data, e.g., type of photographic film, photographic sensitivity, numbers of frames and the like, as stored during a manufacturing process, for use in taking photographs, and photo-taking data as written during photo-taking for use in making prints.

Also, a photographic film cassette is known in which a photographic film leader does not originally protrude from the cassette shell, and which is thus more easily loaded in a camera. Such a film cassette is disclosed in U.S. Pat. Nos. 4,832,275, 4,834,306, and 4,846,418. Rotation of a spool core by means of the fork of the camera in the direction of unwinding the photographic film causes the photographic film leader to advance to the outside of the cassette shell through the photographic film passage mouth. The cassette shell is provided with a device, e.g., annular ridges, for preventing the roll of photographic film from loosening when the spool core is rotated. Such a cassette transmits the rotary force of the spool core to the photographic film leader.

Because the photographic film is kept wound in the roll in the conventional photographic film cassette, a strong tendency to curl remains in the photographic film even when unwound. The photographic film of the above-described type of photographic film cassette has an additional curling tendency in the photographic film leader. Curl in photographic film causes problems in the camera when the photographic film is advanced and transported. When the take-up reel is rotated to transport the photographic film, the fork is left free, whereas the former is left free when the latter is rotated to transport the photographic film. In cameras with the above-described photographic film transporting system, the photographic film is flexed on lateral sides of the magnetic head due to the intermittent photographic film feeding. Accordingly, difficulties may arise in reading/writing data adequately due to poor contact between the film and a magnetic head.

As illustrated in FIG. 8, during advancement of the photographic film leader of photographic film 3 toward a take-up reel 30 in the initial stage of photographic film transportation, the photographic film leader has a strong tendency to curl downward in FIG. 8 and thus moves in a photographic film take-up chamber 73 along its inner wall upstream from the take-up reel 30. Accordingly, the leading end of the photographic film leader may fail to be captured on the take-up reel 30, making it impossible to load the camera with the photographic film contained in the leader-propelling photographic film cassette.

SUMMARY OF THE INVENTION

In view of the foregoing problems, an object of the present invention is to provide a photographic camera having an improved photographic film transporting system which reliably transports photographic film which has a strong tendency to curl.

Another object of the present invention is to provide a camera in which magnetic data can be reliably read/written on the photographic film.

Still another object of the present invention is to provide a camera in which a photographic film leader can be reliably captured on a photographic film take-up reel automatically.

In order to achieve the above and other objects and advantages of this invention, a load-applying device is provided in a camera for applying load to either the fork or the take-up reel, whichever is upstream relative to a photographic film transporting direction. The photographic film can thus be kept flat in spite of a curling tendency, and is prevented from flexing even when being intermittently fed. Also, data storage is improved by virtue of closer contact of the magnetic head with the photographic film.

In accordance with a preferred embodiment, a guide member is provided in the camera so as to project from an inner wall of the photographic film take-up chamber for guiding the photographic film leader downstream from the take-up reel when the photographic film leader is advanced up to the photographic film take-up chamber. The photographic film leader can thus reliably be captured on a photographic film take-up reel automatically without interference due to a curling tendency of the photographic film leader.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
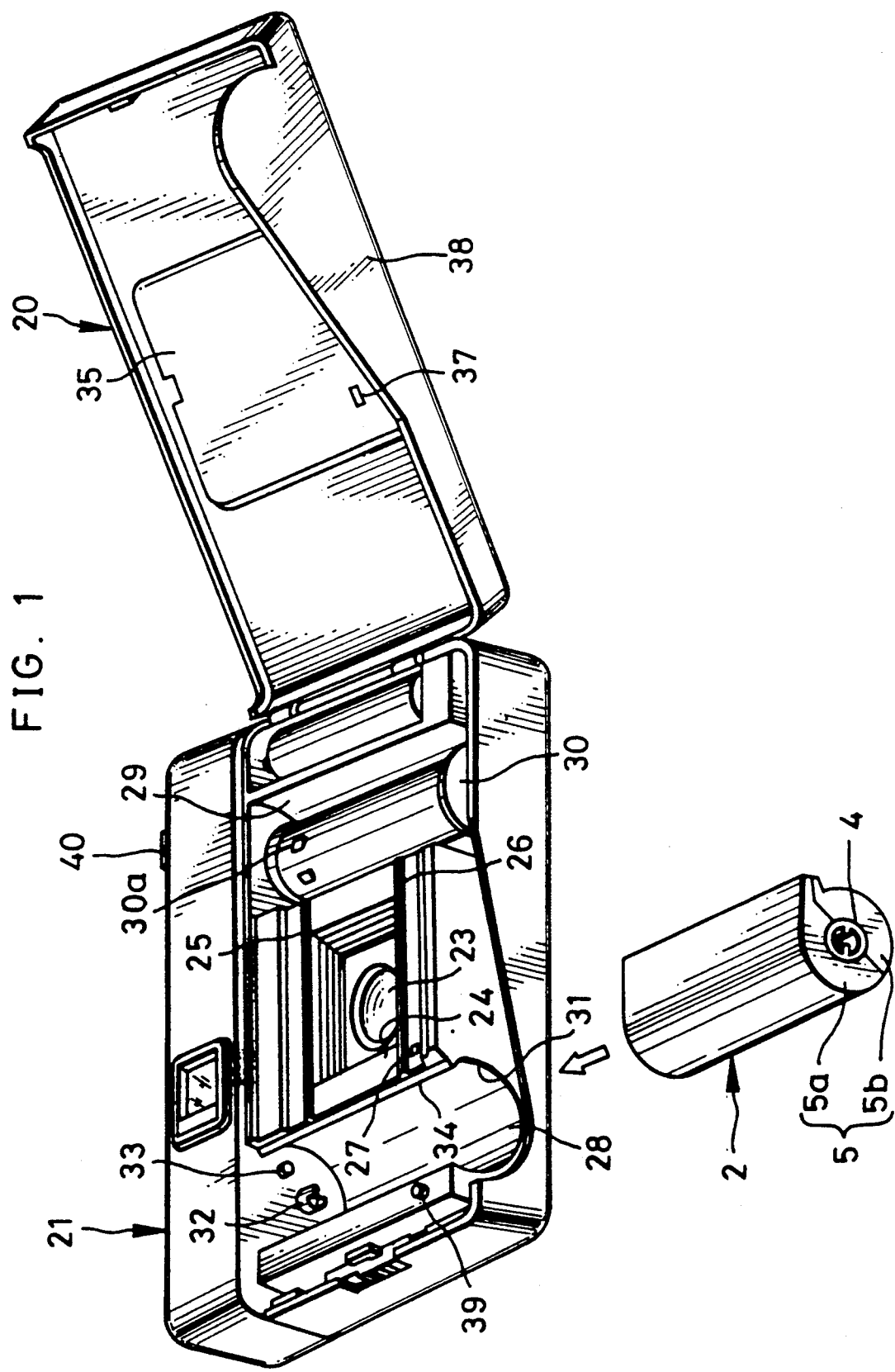
FIG. 1 is a perspective view illustrating a camera and a photographic film cassette to be loaded therein.

FIG. 1 illustrates a preferred embodiment of the present invention and a photographic film cassette for use therewith. A camera body 21 is provided with a centralized exposure aperture when back door 20 is left open. A lens 23 is disposed in front of a frame 24 of the exposure aperture. A pair of photographic film guide rails 25 and 26 are formed in upper and lower positions on aperture frame 24. A reflection type photosensor 27 is provided on the aperture frame 24, so as to count perforations 12 in the film in order to detect an amount of feeding photographic film 3 (see FIG. 2). Next to the aperture frame 24 is a cassette receiving chamber 28 and a photographic film take-up chamber 29, each formed in the camera body 21.

The cassette receiving chamber 28 is loaded with a photographic film cassette 2, whereas the photographic film 3 is wound up in the photographic film take-up chamber 29. A photographic film take-up reel 30 is rotatably provided in the photographic film take-up chamber 29. A plurality of capture members 30a are formed on the cylindrical surface of the take-up reel 30 for engaging with perforations of a photographic film leader fed from the cassette receiving chamber 28 out of the cassette shell 5.

The photographic film cassette 2 consists of the photographic film 3, wound in a roll on a spool core 4 and a cassette shell 5 for containing the photographic film 3 in a light-tight fashion. The cassette shell 5 consists of a pair of plastic shell halves 5a and 5b. The photographic film leader is fully wound up and contained in the cassette shell 5, even in the unused state. The photographic film leader is propelled to the outside of the cassette shell 5 when the spool 4 is rotated in a direction of unwinding.

A lower opening 31 of the cassette receiving chamber 28 is formed on the bottom of the camera body 21, through which opening 31 the photographic film cassette 2 is loaded in the cassette receiving chamber 28. It is noted that, in operation, the back door 20 will be opened just enough to expose the lower opening 31. However, back door 20 is shown to be open widely in FIG. 1 for the purpose of clearly illustrating the structure of the camera body 21. A fork 32, to be rotated by a motor described below, is disposed in the innermost surface of the cassette receiving chamber 28 for being engaged with the spool core 4 so as to rotate it. A cassette detecting switch 33 is provided near the fork 32 for detecting the presence of a photographic film cassette 2 in the cassette receiving chamber 28. A ridge 34 is formed on the cassette receiving chamber 28 for positioning the cassette shell 5.

The back door 20 is provided with a conventional pressure plate 35. A magnetic head 37 is disposed on the back door 20 for recording and reading data on a magnetic recording area 14 on the photographic film 3 (see FIG. 2). The magnetic head 37 penetrates the pressure plate 35 through a hole therein so as to be in contact with the photographic film 3. A bottom portion 38 is formed integrally with the back door 20 for preventing outer light from entering the bottom of the camera body 21. The open/closed state of the back door 20 is detected by a back door switch 39 provided beside the cassette receiving chamber 28. A shutter release button 40 is also provided on the camera body 21.

Figure 2:
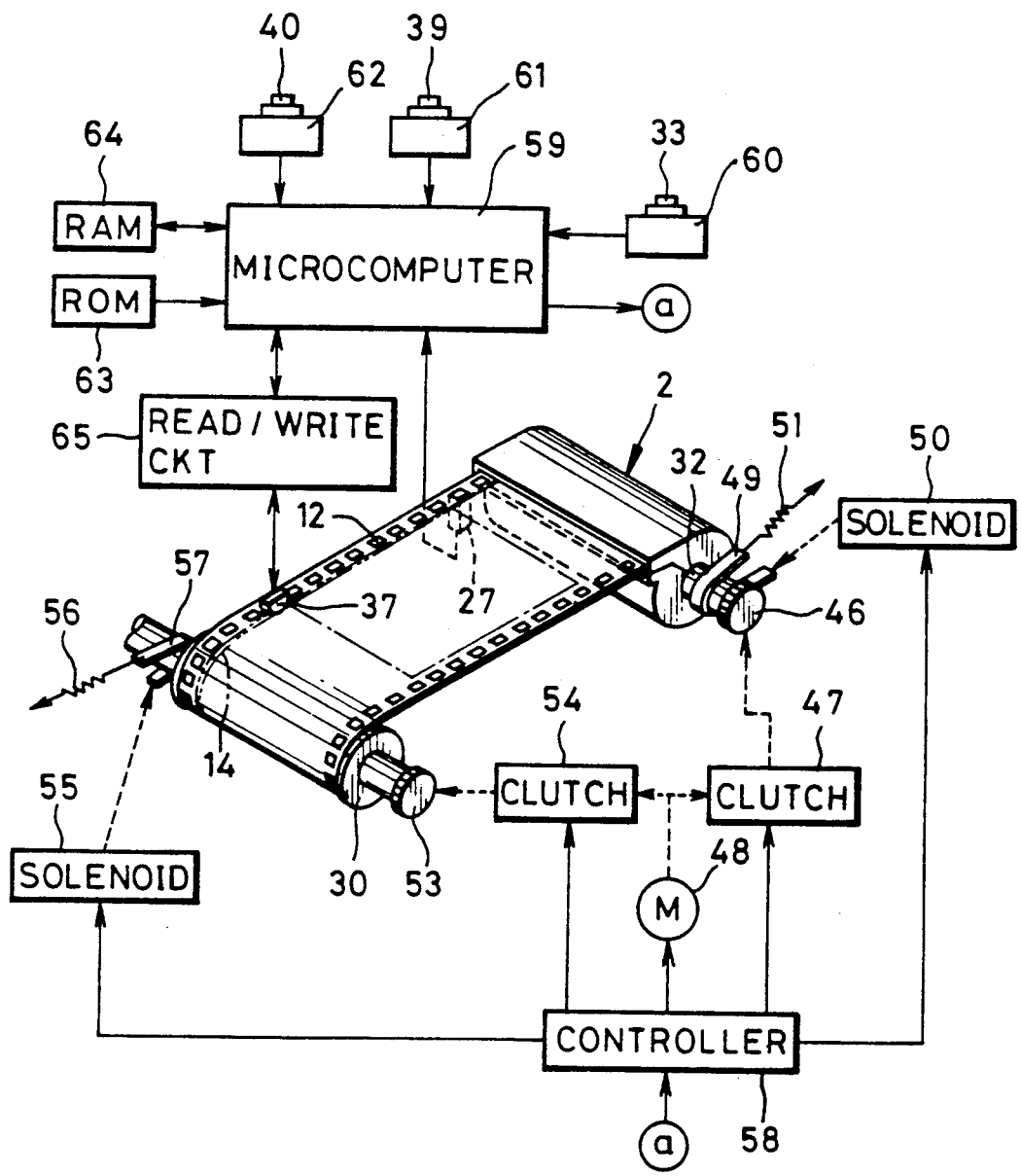
FIG. 2 is a schematic diagram illustrating a photographic film transporting system and a data read/write system incorporated in the inventive camera.

FIG. 2 illustrates the relevant circuits for photographic film transportation and magnetic recording. The fork 32 is driven by a motor 48 via a gear 46 and a clutch 47. A first brake pad 49 is in contact with the shaft of the fork 32. One end of the first brake pad 49 is engaged with a first solenoid 50, whereas its other end is biased by a spring 51. When the first solenoid 50 is driven, the first brake pad 49 is caused to apply a frictional load to the fork 32 in the range of 50 to 200 gf•cm, preferably 50–100 gf•cm. The take-up reel 30 is driven by the motor 48 via a gear 53 and a clutch 54. A second brake pad 57 is mounted on the take-up reel 30. One end of second brake pad 57 is engaged with a second solenoid 55, and the other end thereof is biased by a spring 56. The second brake pad 57 presses the take-up reel 30 so as to apply a load in the range of 50 to 200 gf•cm, similar to the first brake pad 49. A controller 58 is provided to control the motor 48, clutches 54 and 47, and the solenoids 50 and 55. The controller 58 is also connected to a microcomputer 59 for controlling the relevant circuits of the camera.

The cassette detecting switch 33, the back door switch 39 and the release button 40 are connected to the microcomputer 59 respectively via signal generators 60, 61, and 62. A ROM 63, for storing a program relating to controlling the camera, a RAM 64 for provisionally storing data at the time of executing the control program, and a reading/writing circuit 65 for driving the magnetic head 37 to read/write data are all coupled to the microcomputer 59. The operation of the reading/writing circuit 65 is controlled by the microcomputer 59 when either winding up or rewinding the photographic film 3.

Figure 3:
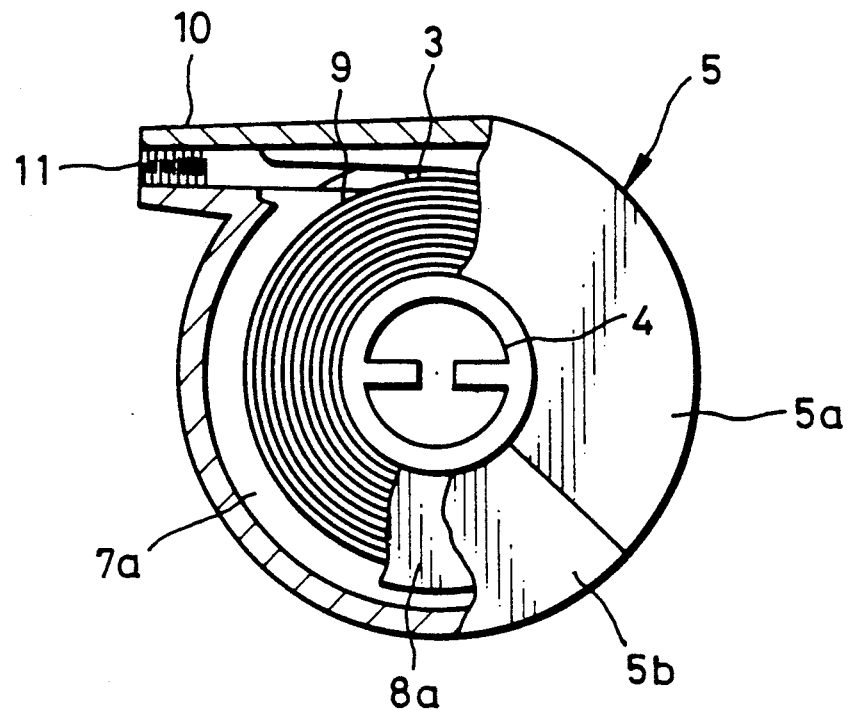
FIG. 3 is a side elevation, partially cut away, illustrating the photographic film cassette.
Figure 4:
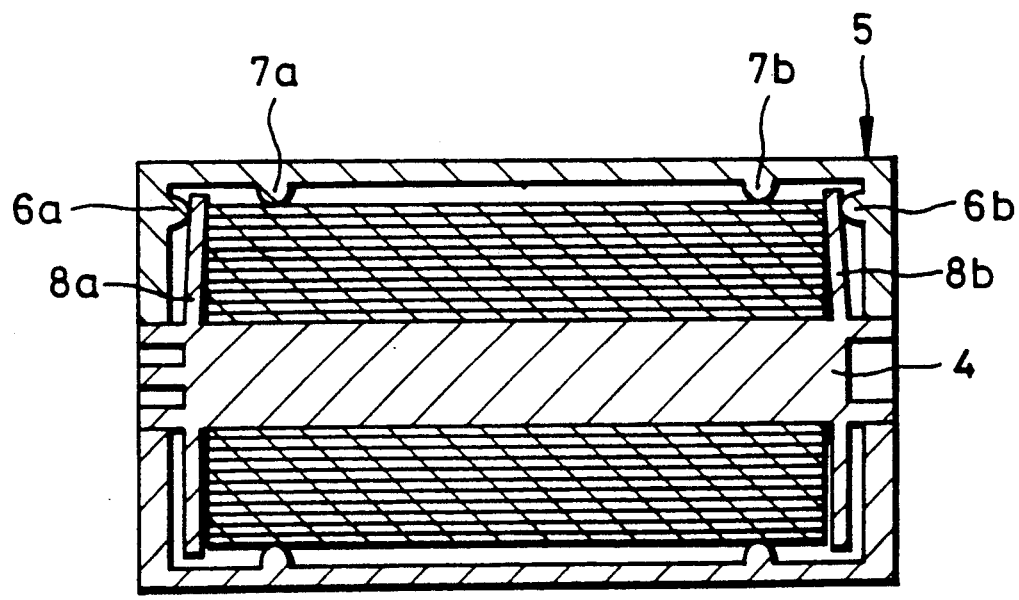
FIG. 4 is a vertical section illustrating the photographic film cassette.

FIGS. 3 and 4 illustrate the photographic film cassette utilized with the above-described camera of the preferred embodiment. Inside the cassette shell 5 are formed a pair of arcuate ridges 6a and 6b on the lateral surfaces along a portion of a circle and a pair of annular ridges 7a and 7b on the cylindrical surface. The annular ridges 7a and 7b are in contact with the outermost surface of the roll of photographic film 3 in order to prevent it from loosening. The arcuate ridges 6a and 6b press spool flanges 8a and 8b formed on the spool 4 in an inward direction. The spool flanges 8a and 8b are thus caused to nip the lateral ends of the outermost turn so as to tend to tighten the turns of photographic film 3 in the upstream position from a port portion 10 of the photographic film cassette 2.

Separating claws 9 are formed integrally with the annular ridges 7a and 7b as illustrated in FIG. 3. The separating claws 9 are in contact with the leading end of the photographic film 3 during the first rotation in the unwinding direction so as to separate it from the roll of photographic film 3 and allow it to pass through a photographic film passage mouth 11 formed on the port portion 10 toward the exterior of the cassette. The port portion 10 is positioned on the ridge 34 of the cassette receiving chamber 28. In this photographic film cassette, the leading end of the photographic film 3 is propelled to the outside when the spool core 4 is rotated in the unwinding direction.

Figure 5:
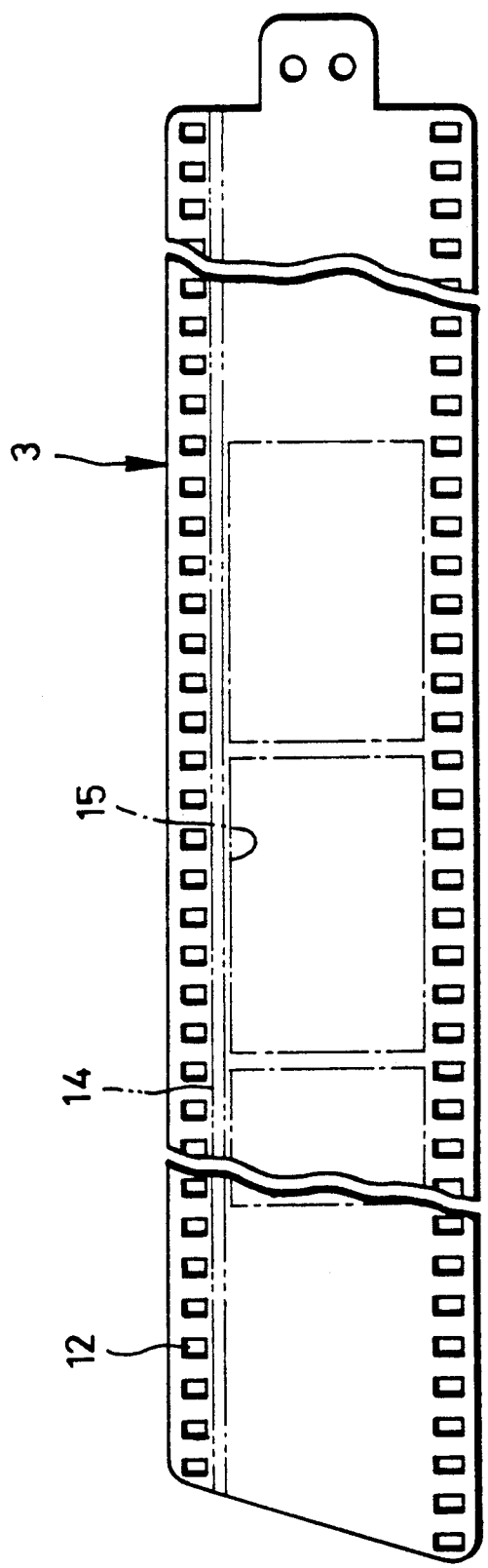
FIG. 5 is an explanatory view illustrating photographic film of the photographic film cassette.

FIG. 5 illustrates the photographic film 3 to be exposed in the camera of the preferred embodiment. The perforations 12 are formed on film 3 on the portions thereof along lateral edges in the lengthwise direction. Along one of the lateral edges is formed a magnetic recording area 14 interior to the perforations 12 as indicated by the two-dot-dash lines. The magnetic recording area 14 is disposed so as to be outside image frames 15 to be recorded. Although disposed along one lateral edge of the photographic film 3, magnetic recording areas may also be formed along both lateral edges, or on the whole of one surface of the photographic film 3. If the magnetic recording area 14 is formed on the whole surface, it is necessary to form the magnetic recording layer from transparent material.

The operation of the camera of the preferred embodiment now will be described below. When the back door 20 is closed with the photographic film cassette 2 loaded in the cassette receiving chamber 28, the signal generators 60 and 61 supply signals to the microcomputer 59, which outputs a drive signal to the controller 58 in accordance with the program in the ROM 63. The controller 58 controls the motor 48 to rotate in the normal direction and drives the clutches 47 and 54. In the wind-up direction or frame-by-frame feeding direction, the motor 48 rotates the fork 32 via the clutch 47 and gear 46 as well as the take-up reel 30 via the clutch 54 and the gear 53.

When the fork 32 rotates the spool core 4, the photographic film leader is propelled out of the cassette shell 5, and slid on the guide rails 25 and 26 to reach the photographic film take-up chamber 29. As soon as the photographic film leader is captured on the take-up reel 30, the controller 58 stops driving the clutch 47 so as to set the fork 32 free. The controller 58 drives the first solenoid 50 to press the first brake pad 49 against the fork 32. Load is applied to the fork 32 to keep the photographic film 3 under tension as the take-up reel 30 rotates. Thus, the photographic film 3 is kept flat and the magnetic recording area 14 is placed in good contact with the magnetic head 37. The data stored in the magnetic recording area 14 is read by the magnetic head 37 while the photographic film 3 is fed. A first frame to be exposed is set on the aperture frame 24 and the motor 48 is stopped.

The shutter release button 40 is then depressed to take a photograph. The controller 58 then drives the first solenoid 50 to press the first brake pad 49 against the fork 32, drives the motor 48 again in the normal direction, and drives the clutch 54. The take-up reel 30 is rotated in the feeding direction to feed the photographic film 3 frame by frame. The first brake pad 49 keeps the photographic film 3 under tension so as to be in good contact with the magnetic head 37. The read/write circuit 65 writes photo-taking data onto the magnetic recording area 14 via the magnetic head 37 during the period of feeding one frame of film. The taking of photographs and writing of phototaking data is successively repeated for each frame. When the last phototaking data is written, the microcomputer 59 supplies the controller 58 with a photographic film rewinding signal.

At this time, the controller 58 drives the second solenoid 55 to press the second brake pad 57 against the take-up reel 30. The controller 58 then drives the motor 48 to rotate in the reverse direction while activating the clutch 47. The fork 32 is thus rotated in the rewinding direction. The photographic film 3 as rewound is kept under tension so that the magnetic head 37 is in good contact with the magnetic recording area 14. The read/write circuit 65 can read the data written while feeding the photographic film 3 out of the magnetic recording area 14 via the magnetic head 37. The photographic film 3 can be checked according to the data as stored, because end faces of the rewound roll of photographic film 3 are neatly flattened.

When the photographic film 3 is rewound up to the photographic film leader, the motor 48 is stopped. It is noted that the magnetic head 37 may read/write data onto the magnetic recording area 14 after the corresponding frame has passed. The inventive construction of the present camera is also applicable to a camera for use with a photographic film cassette of which the photographic film leader initially protrudes from the cassette shell.

Figure 6:
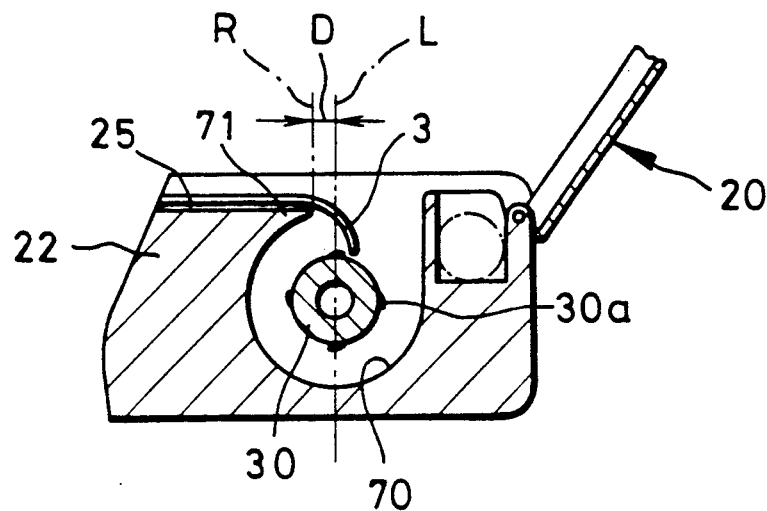
FIG. 6 is a horizontal section illustrating a photographic film take-up chamber of an inventive camera according to another preferred embodiment.

FIG. 6 illustrates a photographic film take-up chamber. In order to ensure that the photographic film leader is reliably captured on the take-up reel, the rear gap of a photographic film take-up chamber 70 is narrowed by virtue of a guide member 71 formed on the side portion of the aperture frame 24. Line L is parallel to the optical axis of the taking lens 23 (see FIG. 2) and vertically intersects the axis of the take-up reel 30. Line R is parallel to the line L and passes through the end of the guide member 71. The desirable interval D between the lines L and R is 5 mm or less. The guide member 71 may also project over the line L. The photographic film leader as slid on the guide rails 25 and 26 is thus prevented from entering the spacing upstream from the take-up reel 30. This ensures reliable engagement between perforations 12 and capture members 30a.

Figure 7:
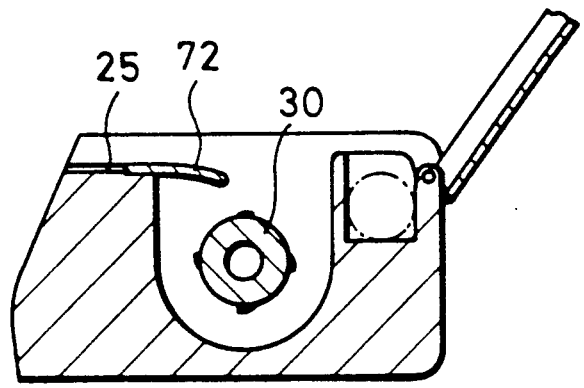
FIG. 7 is a horizontal section illustrating a photographic film take-up chamber according to still another preferred embodiment.
Figure 8:
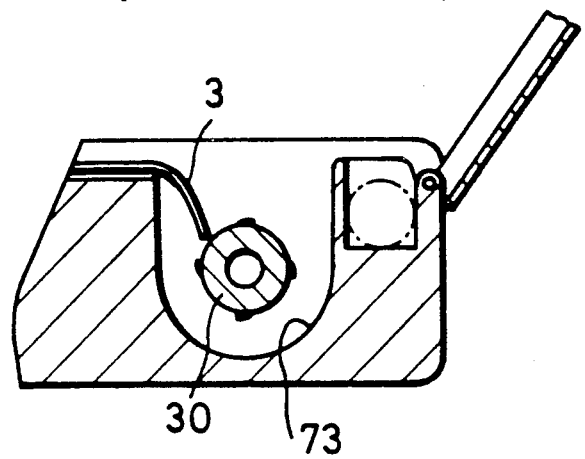
FIG. 8 is a horizontal section illustrating a photographic film take-up chamber of a conventional camera.

Although the guide member 71 is integrally formed on the side portion of aperture frame 24, a flexible tongue 72 may be fixed thereon instead so as to guide the photographic film leader in FIG. 7. For the tongue 72, the rightward ends of the guide rails 25 and 26 are retracted so that the tongue 72 is fixed on the area adjacent to the retracted ends, so that the upper surface of the tongue 72 is no higher than the top of the guide rails 25 and 26. In the alternative, a guide member may also be formed or fixed on the inner wall of the photographic film take-up chamber 70 upstream from the take-up reel 30.

When the spool core 4 is rotated so as to unwind the roll of photographic film 3 in the camera, the photographic film leader is propelled and advanced through the photographic film passage mouth 11 toward the take-up reel 30. The photographic film leader slides on the aperture frame 24 until the photographic film reaches take-up chamber 70. In passing over the aperture frame 24, curl of the photographic film leader is flattened by the pressure plate 35 disposed face to face with the guide rails 25 and 26, so as to slide the photographic film in a straight manner. When the photographic film leader is transported to the photographic film take-up chamber 70, it tends to curl toward the front side of the camera, when the leading end reaches the rotating take-up reel 30. The capture members 30a engage with the perforations 12.

Reading/writing the data can be performed either during feeding or rewinding of the photographic film 3 in the preferred embodiment. However, it may be performed only when feeding the photographic film frame by frame, i.e., when transporting it in one of the two directions one frame at a time. Typically, data is read/written while the take-up reel winds the photographic film 3 frame by frame in the forward transporting direction. In such a case, the camera need only be provided with one brake pad on the fork. In a prewind type camera in which the whole photographic film is prewound on the take-up reel and drawn into the cassette shell frame by frame for exposure, data may be read/written while the fork winds the photographic film, frame by frame, in the rewinding direction in the camera. Such a camera is provided with one brake pad on the take-up reel.

Although the solenoids are engaged with the brake pads for bringing them in contact with the fork and the take-up reel in the above embodiment, the solenoids may be omitted so that the brake pads are in constant contact with the fork and the take-up reel, and regulated to apply a load of 50 to 200 gf•cm (preferably 50 to 100 gf•cm) when the fork and the take-up reel rotate. Further, when the take-up reel is rotated to feed the photographic film 3, the take-up reel may be provided with a load by subjecting the fork to a rotary drive of a low speed. Although a magnetic recording device is used to read/write data, an optical recording device may be used in its place. Further, in the preferred embodiment, the back door of the camera is constructed to be openable to expose the cassette receiving chamber and the photographic film take-up chamber. However, the present invention is also applicable to a camera as disclosed in Japanese Patent Laid-open Publication No. 2-195335, in which a side door instead of the back door is openable to expose only the cassette receiving chamber.

Although the present invention has been fully described by way of the preferred embodiment thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A photographic camera in which a photographic film take-up chamber and a cassette receiving chamber are disposed on both lateral sides of an aperture frame of an exposure aperture, a fork is disposed in said cassette receiving chamber for being coupled to a spool core of a photographic film cassette inserted therein, and a take-up reel is disposed in said photographic film take-up chamber for winding thereon photographic film drawn out of said photographic film cassette, said photographic camera comprising:

a recording head disposed between said photographic film take-up chamber and said cassette receiving chamber for at least one of reading and writing data on said photographic film;

a first drive system operatively engaged with said take-up reel so as to wind said photographic film which has been drawn out of said photographic film cassette, around said take-up reel;

a second drive system operatively engaged with said fork so as to rotate said spool core, via said fork, in a winding direction so as to rewind said photographic film form said take-up reel into said photographic film cassette; and a first load applying device comprising a U-shaped first brake member disposed around said fork and a first solenoid connected to one end of said first brake member so as to engage said first brake member with said fork when said first solenoid is activated and so as to disengage said first brake member from said fork when said first solenoid is not activated so as to apply a load to said fork relative to a direction of transporting said photographic film during a one-frame feeding of said film.

2. A photographic camera as claimed in claim 1, wherein said recording head is a magnetic head, which at least one of reads and writes said data on a magnetic recording area provided on said photographic film.

3. A photographic camera as claimed in claim 2, wherein said magnetic head is mounted on a back door of said camera, which is operable when said photographic film cassette is loaded.

4. A photographic camera as claimed in claim 3, wherein said data written on said photographic film includes data related to making photoprints.

5. A photographic camera as claimed in claim 4, wherein said second drive system is configured so that a photographic film leader of said photographic film cassette to be loaded therein is propelled out of said photographic film cassette when said spool core is rotated in an unwinding direction.

6. A photographic camera as claimed in claim 5, wherein said second drive system is coupled to said camera so as to rotate said spool core in said unwinding direction during a photographic film initial advance before said photographic film leader is captured on said take-up reel while said first drive system winds up said photographic film around said take-up reel.

7. A photographic camera as claimed in claim 6, wherein said first drive system is coupled to said camera so as to wind up said photographic film before exposure around said take-up reel, and said second drive system executes feeding of said film, one image frame of said film at a time.

8. A photographic camera as claimed in claim 6, wherein said first drive system is configured so as to execute said feeding by being operated after exposing one respective image frame, and said second drive system is configured so as to operate upon completing exposure so as to rewind said photographic film into said photographic film cassette.

9. A photographic camera as claimed in claim 1, further comprising:

a controller operatively connected to said magnetic head, said first and second drive systems, and said first solenoid.

10. A photographic camera as claimed in claim 9, wherein said magnetic recording area is formed on a portion of said photographic film between said image frames and perforations formed in said photographic film.

11. A photographic camera as claimed in claim 10, wherein said back door covers a rear side and a bottom side of said camera, and said cassette receiving chamber is uncovered proximate said bottom side so as to receive said photographic film cassette when said back door is open.

12. A photographic camera as claimed in claim 11, further comprising:

a second load-applying device operatively connected to said take-up reel so as to maintain said photographic film at a predetermined tension in order to ensure flatness of said photographic film during said rewinding.

13. A photographic camera as claimed in claim 12, wherein said second load-applying device comprises:

a second brake member disposed around said take-up reel in a shape of a letter U.

14. A photographic camera as claimed in claim 13, wherein said second load-applying device further comprises:

a second solenoid connected to one end of said second brake member so as to engage said second brake member with said take-up reel when activating said second solenoid in accordance with an output of said control means and so as to disengage said second brake member from said take-up reel when said first solenoid is not activated.

15. A photographic camera as claimed in claim 13, wherein said magnetic head is operatively connected to said controller so as to write said data onto said magnetic recording area during said feeding, and read said data therefrom during said rewinding.

16. A photographic camera as claimed in claim 15, further comprising:

a guide member projecting from an inner wall of said photographic film take-up chamber for guiding said photographic film leader toward a side downstream from said take-up reel, against a curling tendency of said photographic film leader, when said photographic film leader is advanced to said photographic film take-up chamber.

17. A photographic camera as claimed in claim 16, wherein an end of said guide member projects to a position within 5 mm of a plane which is vertical to said photographic film transporting direction and which passes through an axis of said take-up reel.

18. A photographic camera, as claimed in claim 17, wherein said guide member is a flexible tongue fixed on said aperture frame.

19. A photographic camera as claimed in claim 17, wherein said guide member is formed integrally with an upstream inner wall of said photographic film take-up chamber.

20. A photographic camera as claimed in claim 1 further comprising:

a guide member provided to project from an inner wall of said photographic film take-up chamber at a position upstream from said take-up reel for guiding said photographic film leader toward a side of said take-up chamber which is downstream from said take-up reel, against a curling tendency of said photographic film leader, when said photographic film leader is advanced up to said photographic film take-up chamber, said guide member projecting to a position within 5 mm of a plane which is vertical to a photographic film transporting direction and which passes through a rotational axis of said take-up reel.

21. A photographic camera as claimed in claim 20, wherein said guide member is formed integrally with an upstream inner wall of said photographic film take-up chamber.

22. A photographic camera as claimed in claim 1, further comprising:

a second load applying device comprising a U-shaped second brake member disposed around said take-up reel and a second solenoid connected to one end of said second brake member so as to engage said second brake member with said take-up reel when activating said second solenoid and so as to disengage said second brake member from said take-up reel when said first solenoid is not activated so as to apply a load to said take-up reel when said film is rewound.

23. A photographic camera as claimed in claim 20, wherein said guide member is flexible tongue fixed on said aperture frame.

* * * * *